(12) United States Patent
Park et al.

(10) Patent No.: US 8,736,556 B2
(45) Date of Patent: May 27, 2014

(54) DISPLAY DEVICE AND METHOD OF DRIVING THE SAME

(75) Inventors: Jong-Woung Park, Seongnam-si (KR);
Hyung-Guel Kim, Yongin-si (KR);
Kee-Han Uh, Yongsin-si (KR);
Joo-Hyung Lee, Gwacheon-si (KR);
Man-Seung Cho, Seoul (KR);
Young-Ok Cha, Gwangmyeong-si (KR)

(73) Assignee: Samsung Display Co., Ltd. (KR)

( * ) Notice: Subject to any disclaimer, the term of this patent is extended or adjusted under 35 U.S.C. 154(b) by 1630 days.

(21) Appl. No.: 11/928,753

(22) Filed: Oct. 30, 2007

(65) Prior Publication Data

US 2008/0218489 A1    Sep. 11, 2008

(30) Foreign Application Priority Data

Mar. 7, 2007 (KR) .................. 10-2007-0022669

(51) Int. Cl.
*G06F 3/041* (2006.01)

(52) U.S. Cl.
USPC ........................................................ 345/173

(58) Field of Classification Search
CPC ..... G06F 3/041; G06F 3/0412; G06F 3/0416; G06F 3/047; G06F 3/0488; G06F 2203/04104
USPC ............. 178/18.01–20.04; 345/104, 156–184
See application file for complete search history.

(56) References Cited

U.S. PATENT DOCUMENTS

| | | | | |
|---|---|---|---|---|
| 7,825,904 B2* | 11/2010 | Hino | | 345/173 |
| 2002/0158913 A1* | 10/2002 | Yamaguchi et al. | | 345/810 |
| 2007/0040814 A1* | 2/2007 | Lee et al. | | 345/173 |
| 2007/0252821 A1* | 11/2007 | Hollemans et al. | | 345/173 |
| 2008/0165132 A1* | 7/2008 | Weiss et al. | | 345/173 |

FOREIGN PATENT DOCUMENTS

| | | |
|---|---|---|
| CN | 1797306 A | 7/2006 |
| JP | 61-118826 A | 6/1986 |
| JP | 06-161661 A | 6/1994 |
| JP | 07-110741 | 4/1995 |
| JP | 2002-055781 A | 2/2002 |
| JP | 2003-099205 A | 4/2003 |
| JP | 2005-100391 A | 4/2005 |
| KR | 10-2006-0012200 A | 2/2006 |
| KR | 10-2007-0020510 A | 2/2007 |

* cited by examiner

*Primary Examiner* — Dwayne Bost
*Assistant Examiner* — Larry Sternbane
(74) *Attorney, Agent, or Firm* — Innovation Counsel LLP

(57) ABSTRACT

A method of driving a display device having a plurality of pixels, a plurality of sensing units, and a plurality of sense data lines to which the plurality of sensing units are connected, includes: reading sense signals from the sense data lines; determining whether or not the display has been touched and the number of touches, generating X-axis and Y-axis position data based on the sense signals, and determining, when the quantity of touches is plural, whether a plurality of touches are sequentially generated, and the touch position of each.

22 Claims, 8 Drawing Sheets

DISPLAY DEVICE AND METHOD OF DRIVING THE SAME

CROSS-REFERENCE TO RELATED APPLICATION

This application claims priority to and the benefit of Korean Patent Application No. 10-2007-0022669 filed in the Korean Intellectual Property Office on Mar. 7, 2007, the entire contents of which are incorporated herein by reference.

BACKGROUND OF THE INVENTION

1. Field of the Invention

The present invention relates to a display device and a method of driving the same.

2. Description of the Related Art

Currently, cathode ray tubes are being replaced by flat panel displays which include liquid crystal displays (LCDs), field emission displays (FEDs), organic light emitting devices (OLEDs), and plasma display panels (PDPs). In an active matrix type of flat panel display, a plurality of pixels are arranged in a matrix and display an image by controlling the light intensity of each pixel according to given luminance information. A liquid crystal display includes a pair of display panels that have pixel electrodes and a common electrode, and a liquid crystal layer having dielectric anisotropy interposed between them. The transmittance of light passing through the liquid crystal layer is controlled by applying a varying electric field to the liquid crystal layer, thereby displaying desired images.

A touch screen panel is a device for enabling machines such as a computer, etc., to carry out desired operations by writing a character, drawing a picture, or executing an icon through touching a finger, a touch pen, or a stylus on a screen. A liquid crystal display having a touch screen panel determines whether and where a user's finger, a touch pen, or so on contacts the screen. However, bonding the touch screen panel to the touch screen panel of the liquid crystal panel, increases cost, decreases luminance of the liquid crystal panel, and increases product thickness.

Instead of bonding a touch screen panel to the LCD display, it has been proposed to integrated a plurality of sensing units within the liquid crystal display so as to detect a change of pressure when the screen is contacted, and thus enables the liquid crystal display to determine touch position information.

The sensing units are arranged in a row direction and a column direction, and when the touch occurs, a sensing unit of the corresponding position outputs a sense signal. However, much processing time is required to resolve whether one or more than one position has been touched at the same time.

SUMMARY OF THE INVENTION

An exemplary embodiment of the present invention provides a method of driving a display device including a plurality of pixels, a plurality of sensing units, and a plurality of sense data lines to which the plurality of sensing units are connected, which includes reading sense signals from the sense data lines, determining from the sense signals whether or not the display has been touched and the determining from the sense signals the number of touches, and generating X-axis and Y-axis position data based on the sense signals, and, when more than one touch occurs, determining whether the plurality of touches occur in sequence and their position (s) based on the X-axis and Y-axis position data.

The determining of a touch position may include determining whether a plurality of X-axis position data exist, and when the plurality of X-axis position data do not exist and a plurality of Y-axis position data do exist, setting X-axis position data of an immediately previous touch as the X-axis position data of the current touch, and setting Y-axis position data having a different value from Y-axis position data of the previous touch as the Y-axis position data of the current touch.

The determining of a touch position may further include when a plurality of X-axis position data exist, determining whether the plurality of Y-axis position data exist, and when a plurality of Y-axis position data do not exist, setting the Y-axis position data of immediately previous touch as the Y-axis position data of the current touch, and setting the X-axis position data having a different value from the X-axis position data of the previous touch as the X-axis position data of the current touch.

The determining of a touch position may further include when a plurality of Y-axis position data exist, setting the X-axis and Y-axis position data having a different value from the X-axis and Y-axis position data of the previous touch as the X-axis and Y-axis position data of the current touch.

The determining of a touch position may further include when the quantity of touches is "1," setting the X-axis and Y-axis position data as X-axis and Y-axis position data of current touch.

The determining of a touch position may further include when the quantity of touches is "1," changing a flag value.

The determining of a touch position may further include determining whether a plurality of touches are sequentially occurred based on the flag value.

The method may further include initializing the flag value after X-axis and Y-axis position data of the current touch are set.

The plurality of touches may occur one by one in each frame. The number of the touches may be "2."

Another embodiment of the present invention provides a display device including: a display panel including a plurality of pixels, a plurality of first sense signal lines extending in a first direction in the display panel and transferring first sense signals, a plurality of second sense signal lines extending in a second direction in the display panel and transferring second sense signals, a plurality of first sensing units that are connected to the first sense signal lines and that generate the first sense signals according to the touch with the display panel, a plurality of second sensing units that are connected to the second sense signal lines and that generate the second sense signals according to the touch with the display panel, and a touch determination unit for determining existence of the touch or not and the quantity of touches, and generating X-axis and Y-axis position data of the touch based on the first sense signals and the second sense signals that are transferred through the first sense signal lines and the second sense signal lines, respectively, and determining, when the quantity of touches is plural, whether a plurality of touches are sequentially occurred, and the touch position based on the X-axis and Y-axis position data.

The touch determination unit may determine, when a plurality of touches are sequentially occurred, whether a plurality of X-axis position data exist, and determines, when a plurality of X-axis position data do not exist, that a plurality of Y-axis position data exist, sets X-axis position data of the immediately previous touch as X-axis position data of the current touch, and sets Y-axis position data having a different value from Y-axis position data of the previous touch among first and second Y-axis position data as Y-axis position data of the current touch.

The touch determination unit may determine, when a plurality of X-axis position data exist, whether a plurality of Y-axis position data exist, sets, when a plurality of Y-axis position data do not exist, Y-axis position data of the immediately previous touch as Y-axis position data of the current touch, and sets X-axis position data having a different value from X-axis position data of the previous touch among first and second X-axis position data as X-axis position data of the current touch.

The touch determination unit may determine, when a plurality of X-axis position data exist, whether a plurality of Y-axis position data exist, and sets, when a plurality of Y-axis position data exist, X-axis and Y-axis position data having a different value from X-axis and Y-axis position data of the previous touch among the plurality of X-axis and Y-axis position data as X-axis and Y-axis position data of the current touch.

The touch determination unit may set, when the quantity of touches is "1," the X-axis and Y-axis position data as X-axis and Y-axis position data of current touch.

The touch determination unit may include a register in which values of a plurality of flags are stored.

The flags may include a sequential touch flag, and the touch determination unit may activate, when the quantity of touches is "1," the sequential touch flag.

The flags may further include first and second touch flags, and the touch determination unit may set, when the touch has occurred, values of the first touch flag and the second touch flag according to the quantity of touches.

The flags may further include first and second position information flags, and the touch determination unit may set a value of the first position information flag and the second position information flag according to whether the plurality of X-axis position data or the plurality of Y-axis position data exist.

The touch determination unit may further include a touch state determination unit for determining existence of the touch or not and the quantity of touches, and generating the X-axis position data and Y-axis position data, and a controller for determining the touch.

The touch determination unit may further include a touch generation signal generator and a touch information output unit, and the touch generation signal generator may generate and output a touch generation signal of the corresponding state according to the touch or not, and the touch information output unit may output X-axis and Y-axis position data of the current touch. The sensing unit may include a variable capacitor that has liquid crystal as a dielectric and that has capacitance that changes according to a pressure, and a reference condenser that is connected in series to the variable condenser.

BRIEF DESCRIPTION OF THE DRAWINGS

The present invention will become more apparent by describing preferred embodiments thereof in detail with reference to the accompanying drawings, in which.

DETAILED DESCRIPTION OF THE EMBODIMENTS

The present invention will be described more fully hereinafter with reference to the accompanying drawings, in which exemplary embodiments of the invention are shown. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, a liquid crystal display, which is an exemplary embodiment of a display device according to the present invention will be described in detail with reference to FIGS. 1 to 6.

Figure 1:
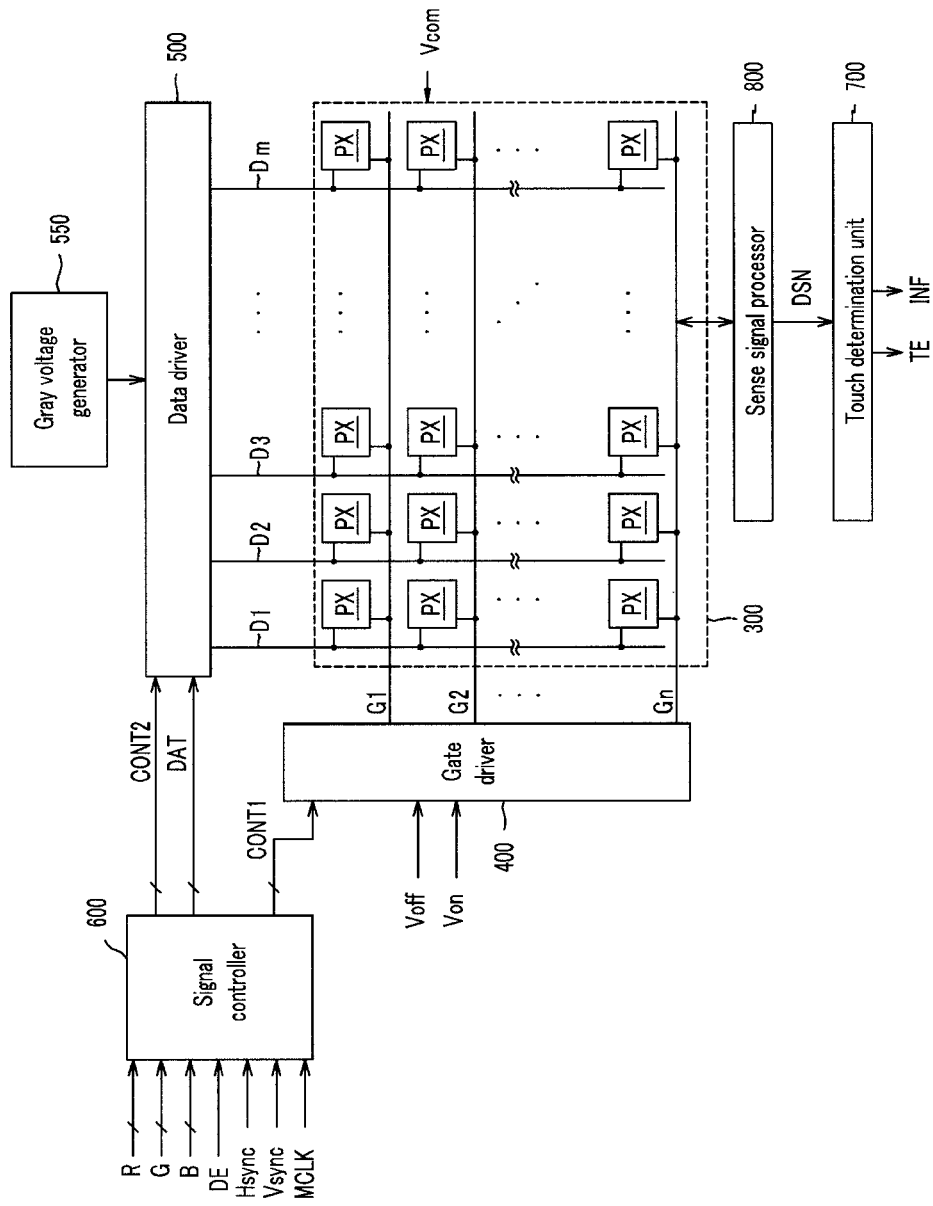
FIG. 1 is a block diagram of a liquid crystal display showing pixels according to an exemplary embodiment of the present invention.
Figure 2:
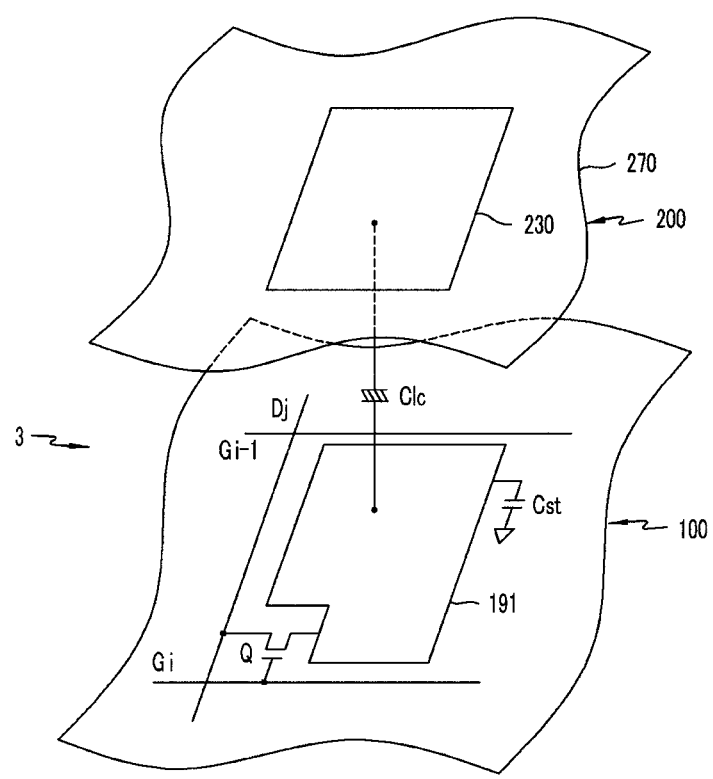
FIG. 2 is an equivalent circuit diagram of a pixel of a liquid crystal display according to an exemplary embodiment of the present invention.
Figure 3:
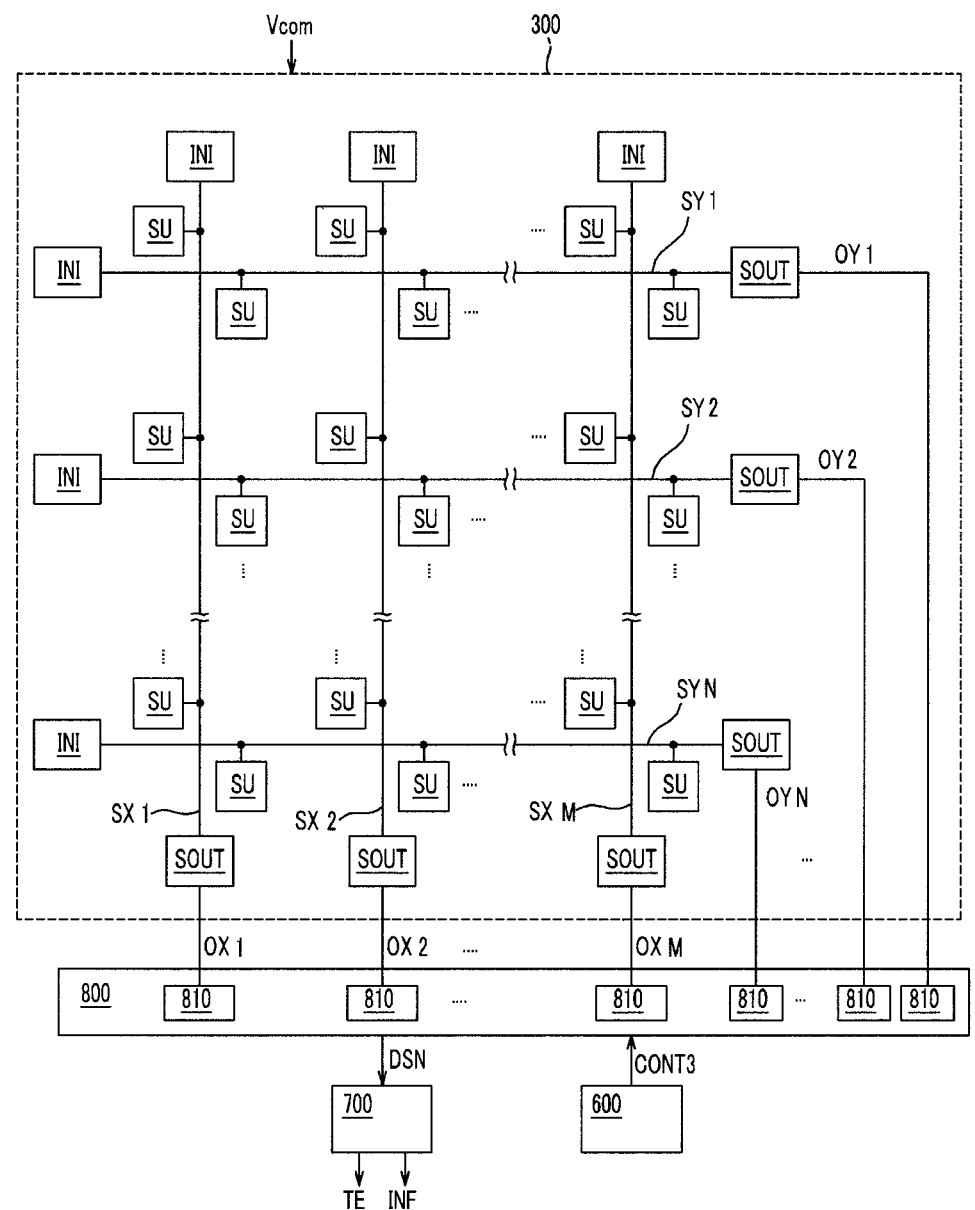
FIG. 3 is a block diagram of a liquid crystal display showing sensing units according to an exemplary embodiment of the present invention.
Figure 4:
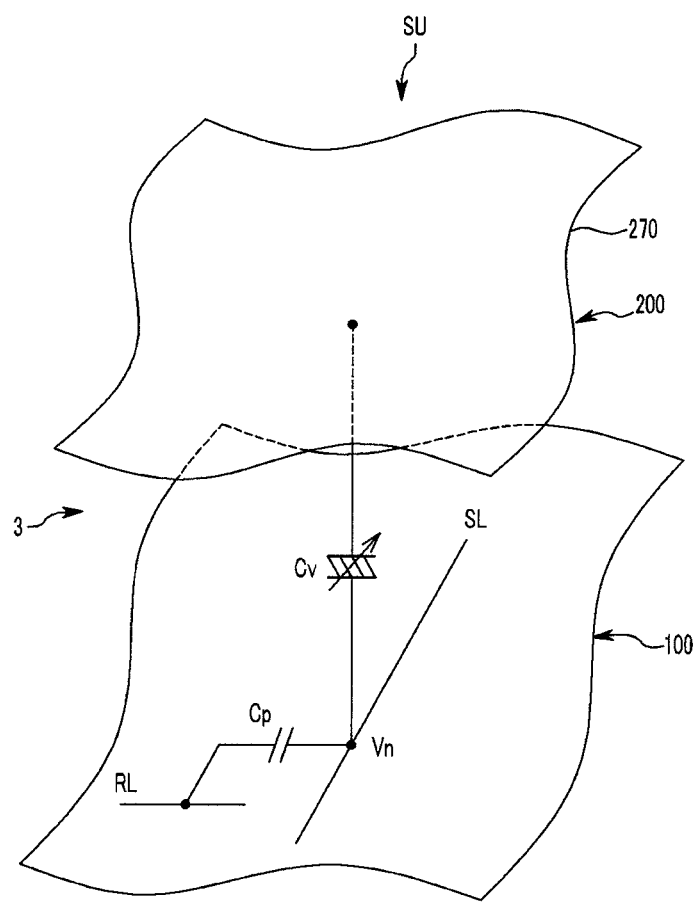
FIG. 4 is an equivalent circuit diagram of a sensing unit of a liquid crystal display according to an exemplary embodiment of the present invention.
Figure 5:
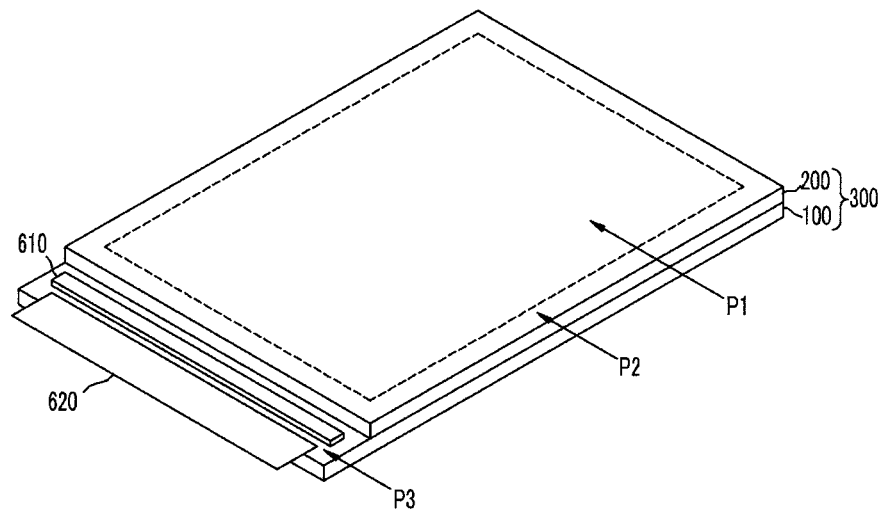
FIG. 5 is a schematic diagram of a liquid crystal display according to an exemplary embodiment of the present invention.
Figure 6:
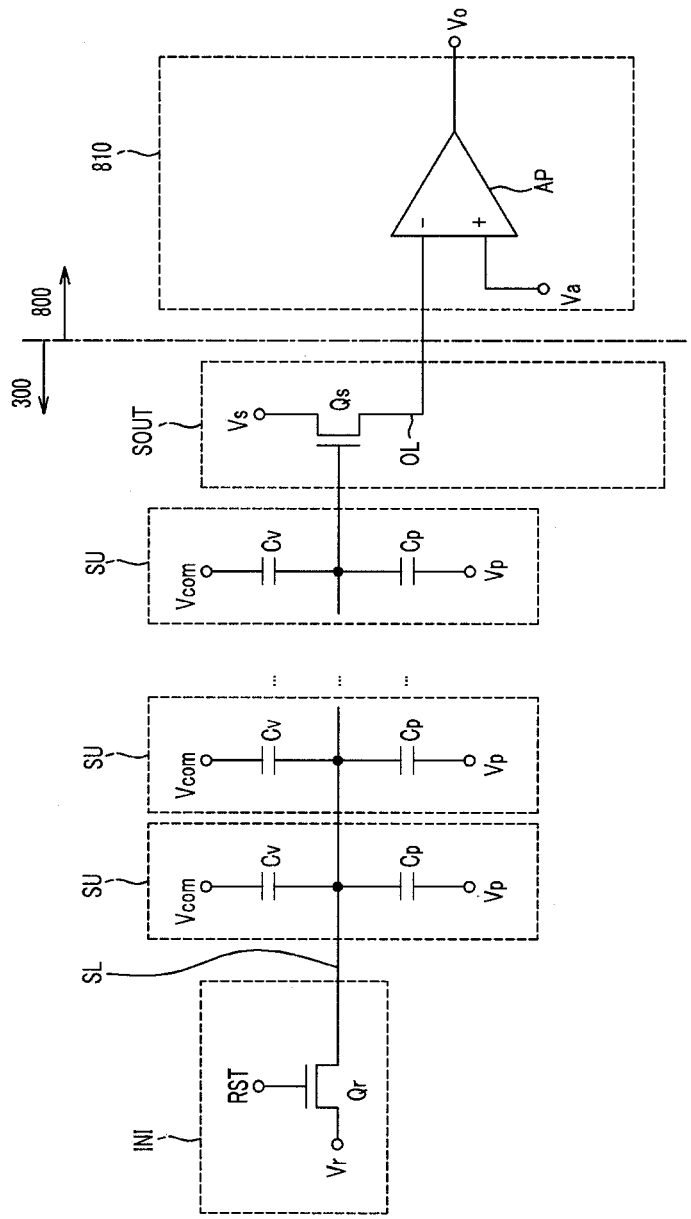
FIG. 6 is an equivalent circuit diagram of a plurality of sensing units that are connected to a detection data line in a liquid crystal display according to an exemplary embodiment of the present invention.

FIG. 1 is a block diagram of a liquid crystal display including pixels according to an exemplary embodiment of the present invention, FIG. 2 is an equivalent circuit diagram of a pixel of a liquid crystal display according to an exemplary embodiment of the present invention, and FIG. 3 is a block diagram of a liquid crystal display showing sensing units according to an exemplary embodiment of the present invention. FIG. 4 is an equivalent circuit diagram of a sensing unit of a liquid crystal display according to an exemplary embodiment of the present invention, and FIG. 5 is a schematic diagram of a liquid crystal display according to an exemplary embodiment of the present invention. FIG. 6 is an equivalent circuit diagram of a plurality of sensing units that are connected to a sense data line in a liquid crystal display according to an exemplary embodiment of the present invention.

Referring to FIGS. 1 and 3, a liquid crystal display according to an exemplary embodiment of the present invention includes a liquid crystal panel assembly 300, a gate driver 400 a data driver 500 and a sense signal processor 800 that are connected to the panel assembly 300, a gray voltage generator 550 that is connected to the data driver 500, a touch determination unit 700 that is connected to the sense signal processor 800, and a signal controller 600 that controls the above elements.

Referring to FIGS. 1 and 3, the liquid crystal panel assembly 300 includes a plurality of display signal lines $G_1$-$G_n$ and $D_1$-$D_m$ and a plurality of pixels PX that are connected thereto and arranged in approximately a matrix, a plurality of sense signal lines $SY_1$-$SY_N$ and $SX_1$-$SX_M$ and a plurality of sensing units SU that are connected thereto and arranged in approximately a matrix, a plurality of reset signal input units INI that are respectively connected to one end of each of the sense signal lines $SY_1$-$SY_N$ and $SX_1$-$SX_M$, a plurality of sense signal output units SOUT that are respectively connected to the other end of each of the sense signal lines $SY_1$-$SY_N$ and $SX_1$-$SX_M$, and a plurality of output data lines $OY_1$-$OY_N$ and $OX_1$-$OX_M$ that are respectively connected to each of the sense signal output units SOUT.

Referring to FIGS. 2 to 4, the liquid crystal panel assembly 300 includes a thin film transistor array panel 100 and a common electrode panel 200 that are opposite to each other, a liquid crystal layer 3 that is interposed therebetween, and spacers (not shown) that form a gap between the two display panels 100 and 200 and that can be somewhat compressed.

The signal lines $G_1$-$G_n$ and $D_1$-$D_m$ include a plurality of gate lines $G_1$-$G_n$ for transferring gate signals and data lines $D_1$-$D_m$ for transferring data voltages, and the sense signal lines $SY_1$-$SY_N$, $SX_1$-$SX_M$, and RL include a plurality of row sense data lines $SY_1$-$SY_N$ and a plurality of column sense data lines $SX_1$-$SX_M$ for transferring sense data signals, and a plurality of reference voltage lines RL for transferring a predetermined magnitude of reference voltage. The reference voltage lines RL may be omitted as needed.

The gate lines $G_1$-$G_n$ and the row sense data lines $SY_1$-$SY_N$ extend in approximately a row direction and are almost parallel to each other, and the data lines $D_1$-$D_m$ and the column sense data lines $SX_1$-$SX_M$ extend in approximately a column direction and are almost parallel to each other. The reference voltage lines RL extend in a row or column direction.

As shown in FIG. 2, each pixel PX, for example, a pixel PX that is connected to an i-th (i=1, 2, . . . , n) gate line $G_i$ and a j-th (j=1, 2, . . . , m) data line $D_j$ includes a switching element Q that is connected to the signal lines $G_i$ and $D_j$, and a liquid crystal capacitor Clc and a storage capacitor Cst that are connected thereto. The storage capacitor Cst may be omitted as needed.

The switching element Q is a three terminal element such as a thin film transistor that is provided in the thin film transistor array panel 100, and a control terminal thereof is connected to the gate lines $G_1$-$G_n$, an input terminal thereof is connected to the data lines $D_1$-$D_m$, and an output terminal thereof is connected to the liquid crystal capacitor Clc and the storage capacitor Cst. The thin film transistor includes amorphous silicon or polycrystalline silicon.

The liquid crystal capacitor Clc has a pixel electrode 191 of the thin film transistor array panel 100 and a common electrode 270 of the common electrode panel 200 as two terminals, and the liquid crystal layer 3 between the two electrodes 191 and 270 functions as a dielectric. The pixel electrode 191 is connected to the switching element Q, and the common electrode 270 is formed on an entire surface of the common electrode panel 200 and receives a common voltage Vcom. Unlike FIG. 2, the common electrode 270 may be provided on the thin film transistor array panel 100, and in this case, at least one of the two electrodes 191 and 270 may be formed in a line shape or a bar shape.

The storage capacitor Cst is an auxiliary capacitor for the liquid crystal capacitor Clc. The storage capacitor Cst is formed by the overlap of a separate signal line (not shown) and the pixel electrode 191 that are provided in the thin film transistor array panel 100 with an insulator interposed therebetween, and a predetermined voltage such as a common voltage Vcom is applied to the separate signal line. However, the storage capacitor Cst may be formed by the overlap of the pixel electrode 191 and a previous gate line directly on the pixel electrode 191 via an insulator.

For color display, by allowing each pixel PX to inherently display one of the primary colors (spatial division) or to sequentially alternately display the primary colors (temporal division), a desired color is recognized with the spatial and temporal combination of the primary colors. An example of a set of the primary colors includes red, green, and blue colors. FIG. 2 shows, as an example of spatial division, that each pixel PX is provided with a color filter 230 for displaying one of the primary colors in a region of the common electrode panel 200 corresponding to the pixel electrode 191. Unlike the case of FIG. 2, the color filter 230 may be formed on or under the pixel electrode 191 of the thin film transistor array panel 100.

At least one polarizer (not shown) for polarizing light is attached to an external surface of the liquid crystal panel assembly 300.

FIG. 4 shows an example of a sensing unit SU according to an exemplary embodiment of the present invention, and each sensing unit SU includes a variable capacitor Cv that is connected to a row or column sense data line (hereinafter referred as to a "sense data line") that is indicated by reference numeral SL or a reference capacitor Cp that is connected between the sense data line SL and a reference voltage line RL.

The reference capacitor Cp is formed by the overlap of the reference voltage line RL and the sense data line SL of the thin film transistor array panel 100 with a dielectric (not shown) disposed therebetween.

The variable capacitor Cv has the sense data line SL of the thin film transistor array panel 100 and the common electrode 270 of the common electrode panel 200 as two terminals. The liquid crystal layer 3 is formed between the thin film transistor array panel 100 and the common electrode panel 200 and functions as a dielectric. Capacitance of the variable capacitor Cv has a value that changes by external stimulation such as a user's touch that is applied to the liquid crystal panel assembly 300. As the external stimulation, a pressure is exemplified, and if a pressure is applied to the common electrode panel 200, a spacer is compressively deformed, and thus a distance between two terminals changes, whereby capacitance of the variable capacitor Cv changes. If the capacitance changes, a magnitude of a node voltage Vn between the reference capacitor Cp and the variable capacitor Cv depending on a magnitude of the capacitance changes. The node voltage Vn as a sense data signal is transmitted through a sense data line SL, and the touch or not can be determined based on the node voltage Vn.

Referring to FIG. 6, each of a plurality of reset signal input units INI has the same structure and includes a reset transistor Qr. The reset transistor Qr is a three terminal element of a thin film transistor, and a control terminal thereof is connected to a reset control signal RST, an input terminal thereof is connected to a reset voltage Vr, and an output terminal thereof is connected to sense data lines ($SX_1$-$SX_M$ or $SY_1$-$SY_N$ in FIG. 3). According to the reset control signal RST, a reset voltage Vr is supplied to the sense data line SL.

Further, each of a plurality of sense signal output units SOUT has the same structure and includes an output transistor Qs. The output transistor Qs is a three terminal element of a thin film transistor, and a control terminal thereof is connected to a sense data line SL, an input terminal thereof is connected to an input voltage Vs, and an output terminal thereof is connected to an output data line OL. An output signal is generated based on a sense data signal flowing through the sense data line SL. The output signal may be an output current. Alternatively, the output transistor Qs may generate a voltage as an output signal.

The reset transistor Qr and the output transistor Qs, which are thin film transistors, are formed together with a switching element Q.

The output data lines $OY_1$-$OY_N$ and $OX_1$-$OX_M$ include a plurality of row and column output data lines $OY_1$-$OY_N$ and $OX_1$-$OX_M$, each of which is respectively connected to the row and column sense data lines $SY_1$-$SY_N$ and $SX_1$-$SX_M$ through the corresponding sense signal output unit SOUT. The output data lines $OY_1$-$OY_N$ and $OX_1$-$OX_M$ are connected to the sense signal processor 800, and transfer an output signal from the sense signal output unit SOUT to the sense signal processor 800. The row and column output data lines $OY_1$-$OY_N$ and $OX_1$-$OX_M$ extend in approximately a column direction and are substantially parallel to each other.

Referring to again FIG. 1, the gray voltage generator 550 generates all gray voltages or a predetermined number of gray voltages (hereinafter referred to as "reference gray voltages") that are related to transmittance of a pixel PX. The (reference) gray voltages may have a positive value or a negative value relative to a common voltage Vcom.

The gate driver 400 is connected to the gate lines $G_1$-$G_n$ of the liquid crystal panel assembly 300, and synthesizes a gate-on voltage Von and a gate-off voltage Voff to generate the gate signals for application to the gate lines $G_1$-$G_n$.

The data driver 500 is connected to the data lines $D_1$-$D_m$ of the liquid crystal panel assembly 300, and it selects a gray voltage from the gray voltage generator 550 and applies the selected gray voltage as a data voltage to the data lines $D_1$-$D_m$. However, when the gray voltage generator 550 generates only a few of the reference gray voltages rather than all gray voltages the data driver 500 may divide the reference gray voltages to generate the data voltages from among the reference gray voltages.

The sense signal processor 800 includes a plurality of amplifying units 810 that are connected to output data lines $OY_1$-$OY_N$ and $OX_1$-$OX_M$ of the liquid crystal panel assembly 300.

As shown in FIG. 6, each of the plurality of amplifying units 810 has the same structure, and each amplifying unit 810 includes an amplifier AP. The amplifier AP has an inversion terminal (−), a non-inversion terminal (+), and an output terminal, and the inversion terminal (−) is connected to the output data line OL, and the non-inversion terminal (+) is connected to a reference voltage Va. Each amplifying unit 810 amplifies an output current from the output transistor Qs using the amplifier AP, thereby generating a sense signal Vo.

Accordingly, the sense signal processor 800 converts an analog sense signal Vo from the amplifying unit 810 to a digital signal using an analog-to-digital converter (not shown), and generates a digital sense signal DSN.

The touch determination unit 700 receives the digital sense signal DSN from the sense signal processor 800 to perform a predetermined operation, determines whether or not the display has been touched and the touch position, and then sends touch information INF to an external device. The touch determination unit 700 monitors the state of the sensing unit SU based on the digital sense signal DSN. The touch determination unit 700 will be described later in detail.

The signal controller 600 controls operations of the gate driver 400, the data driver 500, the gray voltage generator 550, and the sense signal processor 800.

Each of the driving devices 400, 500, 550, 600, 700, and 800 may be directly mounted on the liquid crystal panel assembly 300 in at least one integrated circuit (IC) chip form, may be mounted on a flexible printed circuit film (not shown) to be attached to the liquid crystal panel assembly 300 in a form of a tape carrier package (TCP), or may be mounted on a separate printed circuit board (PCB) (not shown). Alternatively, the driving devices 400, 500, 550, 600, 700, and 800 may be integrated with the liquid crystal panel assembly 300, together with the signal lines $G_1$-$G_n$, $D_1$-$D_m$, $SY_1$-$SY_N$, $SX_1$-$SX_M$, $OY_1$-$OY_N$, $OX_1$-$OX_M$, and RL and the thin film transistors Q.

Referring to FIG. 5, the liquid crystal panel assembly 300 is divided into a display area P1, an edge area P2, and an exposure area P3. Most of the pixels PX, the sensing units SU, and the signal lines $G_1$-$G_n$, $D_1$-$D_m$, $SY_1$-$SY_N$, $SX_1$-$SX_M$, $OY_1$-$OY_N$, $OX_1$-$OX_M$, and RL are positioned in the display area P1. The common electrode panel 200 includes a light blocking member (not shown) such as a black matrix, and the light blocking member covers most of the edge area P2, thereby blocking light from the outside. No pixels PX are disposed in the edge area P2, but the reset transistors Qr and the output transistors Qs are positioned therein.

Because the common electrode panel 200 is smaller than the thin film transistor array panel 100, a portion of the thin film transistor array panel 100 forms the exposure area P3, in which a single chip 610 is mounted together with flexible printed circuit board (FPC board) 620.

The single chip 610 includes driving devices for driving a liquid crystal display, i.e., the gate driver 400, the data driver 500, the gray voltage generator 550, the signal controller 600, the touch determination unit 700, and the sense signal processor 800. The mounting area can be reduced and consumption power can be lowered by integrating the driving devices 400, 500, 550, 600, 700, and 800 within the single chip 610. At least one among them or at least one circuit element for constituting them can be disposed outside of the single chip 610, as needed.

The signal lines $G_1$-$G_n$ and $D_1$-$D_m$ and the sense data lines $SY_1$-$SY_N$ and $SX_1$-$SX_M$ are extended to the exposure area P3 to be connected to the corresponding driving devices 400, 500, and 800.

The FPC board 620 receives a signal from an external device to transfer the signal to the single chip 610 or the liquid crystal panel assembly 300, and an edge of the FPC board 620 is formed as a connector (not shown) to facilitate connection to the external device.

Now, the display operation and the sense operation of the liquid crystal display will be described in detail.

The signal controller 600 receives input image signals R, G, and B and an input control signal for controlling the input image signals R, G, and B from an external graphics controller (not shown). The input image signals R, G, and B include luminance information of each pixel PX, and the luminance has grays of a predetermined number, for example, 1024 ($=2^{10}$), 256 ($=2^8$), or 64 ($=2^6$). The input control signal includes, for example, a vertical synchronization signal Vsync, a horizontal synchronization signal Hsync, a main clock signal MCLK, and a data enable signal DE.

The signal controller 600 properly processes the input image signals R, G, and B based on the input image signals R, G, and B and the input control signal according to an operating condition of the liquid crystal panel assembly 300, and generates gate control signals CONT1 and data control signals CONT2 and then sends the gate control signals CONT1 to the gate driver 400 and sends the data control signals CONT2 and the processed image signals DAT to the data driver 500.

The gate control signals CONT1 includes a scanning start signal STV for instructing the scanning to start and at least one clock signal for controlling the output period of a gate-on voltage Von. The gate control signal CONT1 may further include an output enable signal OE for limiting the sustain time of the gate-on voltage Von.

The data control signals CONT2 includes a horizontal synchronization start signal STH for notifying of the start of transfer of digital image signals DAT for one row of pixels PX, load signal LOAD and data clock signal HCLK for applying an analog data voltage to the data lines $D_1$-$D_m$. The data control signals CONT2 may further include an inversion signal RVS for inverting the polarity of a data voltage with respect to a common voltage Vcom (hereinafter, "polarity of a data voltage with respect to a common voltage" is referred to as "polarity of a data voltage").

The data driver 500 receives digital image signals DAT for one row of pixels PX according to the data control signals CONT2 from the signal control unit 600, converts the digital image signals DAT to analog data voltages by selecting a gray voltage corresponding to each digital image signal DAT, and then applies the analog data voltages to the corresponding data lines $D_1$-$D_m$.

The gate driver 400 applies a gate-on voltage Von to the gate lines $G_1$-$G_n$ according to the gate control signals CONT1 from the signal control unit 600 to turn on the switching element Q that is connected to the gate lines $G_1$-$G_n$. Accordingly, data voltages that are applied to the data lines $D_1$-$D_m$ are applied to the corresponding pixels PX through the turned-on switching elements Q.

The difference between the common voltage Vcom and the data voltage that is applied to the pixel PX is represented as a charge voltage, i.e. a pixel voltage of the liquid crystal capacitor Clc. Liquid crystal molecules have different arrangement according to a magnitude of the pixel voltage, so that polarization of light passing through the liquid crystal layer 3 changes. The change in the polarization is represented with the change in transmittance of light by the polarizer, whereby the pixel PX displays luminance that is represented with a gray of an image signal DAT.

By repeating the process with a unit of one horizontal period (referred to as "1H", the same as one period of the horizontal synchronization signal Hsync and the data enable signal DE), a gate-on voltage Von is sequentially applied to all gate lines $G_1$-$G_n$ and data voltages are applied to all pixels PX, so that an image of one frame is displayed.

The state of an inversion signal RVS that is applied to the data driver 500 is controlled so that the next frame starts when one frame ends, and the polarity of a data voltage that is applied to each pixel PX is opposite to the polarity in a previous frame ("frame inversion"). The inversion signal RVS may also be controlled such that the polarity of data voltages flowing through one data line may be periodically reversed during one frame (e.g. row inversion and dot inversion), or the polarity of the data voltages in one package that are applied to one pixel row may be reversed (e.g. column inversion and dot inversion).

The sense signal processor 800 initializes sense signal line SL by applying a reset voltage Vr to sense signal line SL according to the reset signal RST, then reads an amplified sense data signal from an output sense line OL according to the state of a common voltage Vcom. The sense signal processor 800 again amplifies the read amplified sense data signal, then converts the signal to a digital sense signal and transmits the signal to the touch determination unit 700.

The sense signal processor 800 reads sense data signals that are applied through output data lines $OY_1$-$OY_N$ and $OX_1$-$OX_M$ between frames in a predetermined period, for example, one time in each frame, by a sense data control signals CONT3. However, it is not necessary to always perform such a reading operation in each frame and the reading operation may be performed one by one in a plurality of frames as needed. Further, at least two reading operations may be performed within a predetermined period.

Referring to FIG. 6, the reading operation of the sense data signal is described in detail.

When the reset transistor Qr is turned on by a reset signal RST, a reset voltage Vr having the corresponding magnitude is applied to initialize sense line SL. When the reset transistor Qr is turned off by reset signal RST after a predetermined time, the sense line SL is electrically disconnected from the reset voltage Vr. The voltage that is applied to the control terminal of an output transistor Qs changes based on the change of a common voltage Vcom and the change in capacitance of the variable capacitor Cv according to the "touch or not" state of sensing unit SU. According to the voltage change, the magnitude of a current of the sense data signal flowing to the output transistor Qs changes.

Thereafter, the sense signal processor 800 reads a sense signal Vo.

Because the sense data signal changes based on the reset voltage Vr, the sense signal will always have a voltage level within a constant range making the "touch or not" state and the touch position easily determinable.

After reading the analog sense data signal using each amplifying unit 810, the sense signal processor 800 converts sense signals Vo to digital sense signals DSN and sends the converted digital signals to the touch determination unit 700.

The touch determination unit 700 receives the digital sense signals DSN to determine the touch occurrence and the touch position and transmits the results thereof to an external device. The external device transmits image signals R, G, and B based on the results to a liquid crystal display and thus displays a screen, a menu, or so on that is selected by a user.

Hereinafter, operations of the touch determination unit 700 according to an exemplary embodiment of the present invention will be described in detail with reference to FIGS. 7 and 8.

Figure 7:
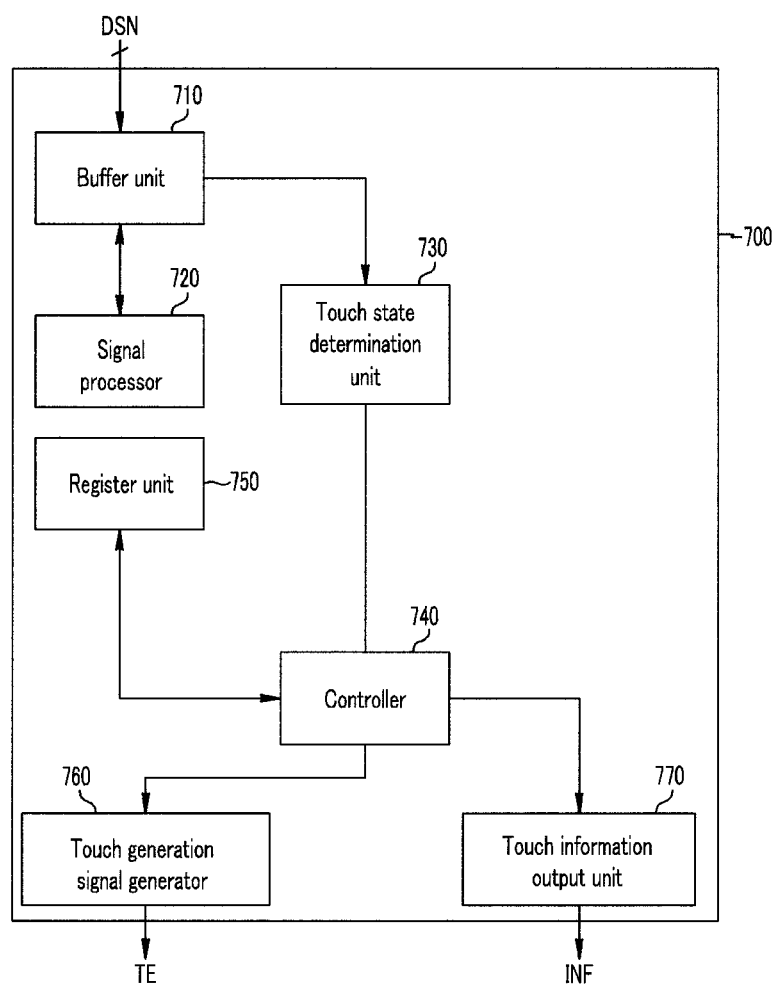
FIG. 7 is a block diagram of a touch determination unit according to an exemplary embodiment of the present invention.
Figure 8:
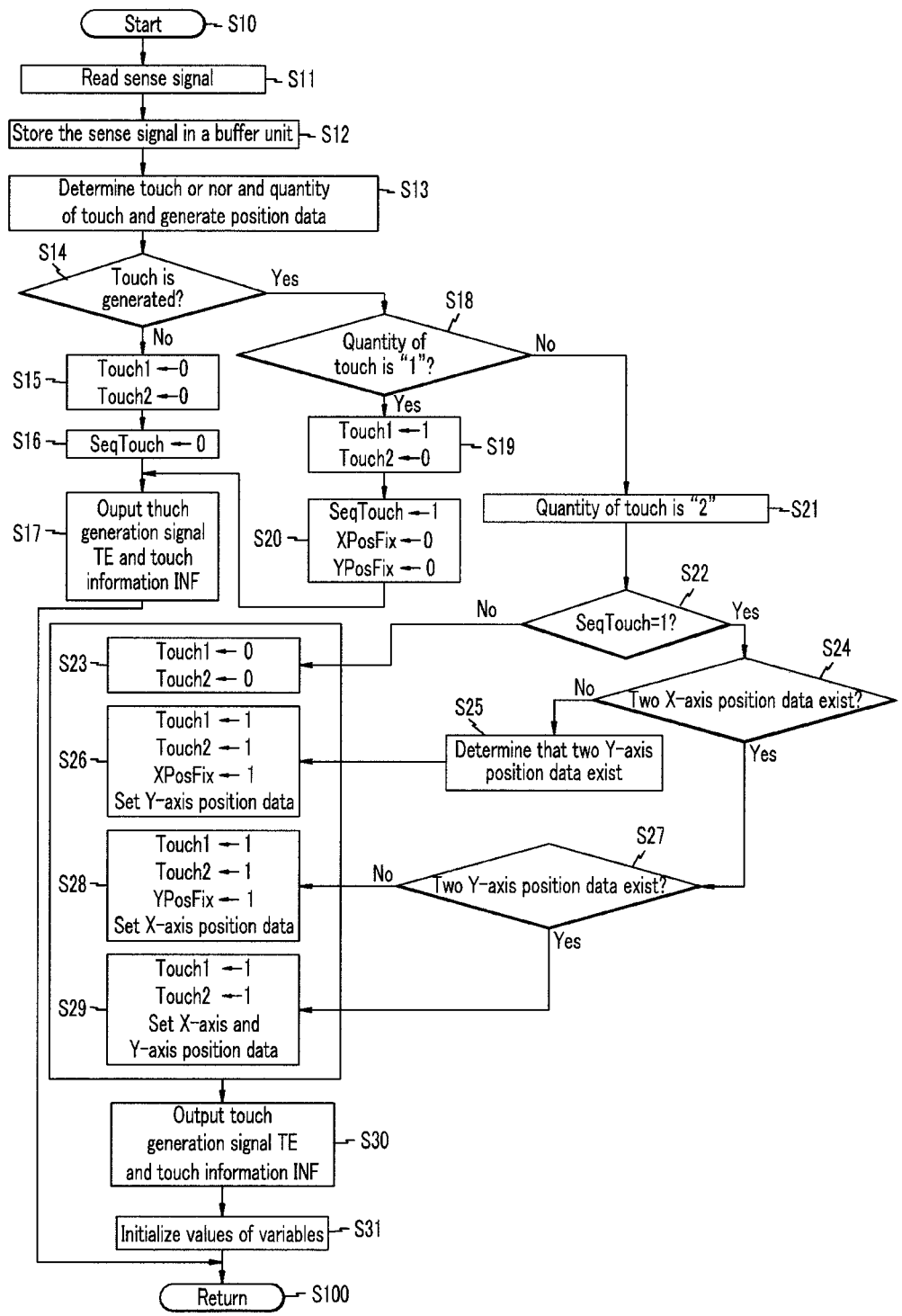
FIG. 8 is a flowchart representing operations of a touch determination unit according to an exemplary embodiment of the present invention.

FIG. 7 is a block diagram of the touch determination unit 700 according to an exemplary embodiment of the present invention, and FIG. 8 is a flowchart representing operations of the touch determination unit 700 according to an exemplary embodiment of the present invention.

Referring to FIG. 7, the touch determination unit 700 includes a buffer unit 710, a signal processor 720, a touch state determination unit 730, a controller 740, a register unit 750, a touch generation signal generator 760, and a touch information output unit 770.

The touch determination unit 700 is operated as follows.

When the operation of the touch determination unit 700 starts (S10), the buffer unit 710 of the touch determination unit 700 reads and stores a plurality of sense signals DSN that are applied from the sense signal processor 800 (steps S11 and S12).

Thereafter, the signal processor 720 processes the read sense signals DSN to available signals and stores the processed sense signals in the buffer unit 710 (step S12). Next, the touch state determination unit 730 determines whether or nor a touch has occurred and the number of touches using sense signals stored in the buffer unit 710, and generates X-axis and Y-axis position data of a touch position (step S13).

The value of the sense signal indicating that a touch has occurred is "1" and the value of the sense signal indicating that a touch has not occurred is "0". The touch state determination unit 730 determines whether sense signals having a value of "1" exists and the number of touches based on the position of the sense signal having a value of "1", and generates position data.

The touch state determination unit 730 recognizes a single touch when all of a predetermined number of sense signals adjacent to an X-axis or Y-axis direction have a value of "1," i.e., represent a touch state.

Further, the touch state determination unit 730 may generate position data based on one of the plurality of sense signals, when a plurality of sense signals sequentially have a value of "1", Next, the controller 740 determines a touch position based on data from the touch state determination unit 730 and several flag values stored in the register unit 750.

That is, the controller 740 determines whether the touch has occurred (step S14).

When the touch has not occurred, the controller 740 sets the value of two touch flags touch1 and touch2, which are flags for representing whether the touch occurs or not to "0", which is an inactivation state, sets a value of a sequential touch flag SeqTouch to "0", which is an inactivation state, and stores the values of the flags touch1, touch2, and SeqTouch in the register unit 750 (steps S15 and S116).

Thereafter, the controller 740 goes to step S17.

Because the touch has not occurred, the controller 740 sets a state of a touch generation signal TE that is output through the touch generation signal generator 760 to a non-touch state to notify that the touch has not occurred, and does not output touch information INF such as a touch position and the quantity of touches through the touch information output unit 770. As an example, a state of a touch generation signal TE representing a non-touch state may be a low level and a state of a touch generation signal TE representing a touch state may be a high level, however a state of a touch generation signal TE representing a non-touch state may be a high level and a state of a touch generation signal TE representing a touch state may be a low level.

When the touch has occurred at step S14, the controller 740 determines whether the quantity of touches is "1" (step S18).

When the quantity of touches is "1", the controller 740 sets a value of a touch flag touch1 to "1", which is an active state, sets a value of a touch flag touch2 to "0", which is an inactive state, and stores the values of the flags touch1 and touch 2 in the register unit 750 (step S19).

In this embodiment, when only the touch flag touch1 has a value of "1," it represents that one touch has occurred, and when two touch flags touch1 and touch2 have a value of "1," it represents that two touches have occurred.

In this embodiment, because the quantity of touch points that are simultaneously touched is set to 2 at a maximum, the quantity of the touch flags touch1 and touch2 is "2," however the quantity of touch points that are simultaneously touched can be changed, and the quantity of the touch flags can also be changed.

Thereafter, the controller 740 changes a value of the sequential touch flag SeqTouch to "1" and stores the value in the register unit 750 (step S20). The controller 740 can determine whether touches have occurred sequentially, i.e. one by one in each frame, when two or more touch points are simultaneously detected based on a value of the sequential touch flag SeqTouch. Further, the controller 740 sets a value of X-axis and Y-axis position information flags XPosFix and YPosFix to "0", which is an inactive state, and stores the value to the register unit 750 (step S20).

Thereafter, the controller 740 outputs the touch generation signal TE and the touch information INF of the corresponding state through the touch generation signal generator 760 and the touch information output unit 770, respectively, at step S17. That is, because one touch has occurred, the controller 740 sets a state of the touch generation signal TE to a touch state, outputs the state through the touch generation signal generator 760, and outputs position data of a current touch and the quantity of touches "1" through the touch information output unit 770. In this case, the touch generation signal TE and the touch information INF may be transmitted through an interface such as a serial parallel interface (SPI) and I$^2$C.

If the quantity of touches is not "1" at step S18, the controller 760 determines that the quantity of touches is "2" (step S21).

Next, the controller 740 determines whether a value of the sequential touch flag SeqTouch that is stored in the register unit 750 is "1" (step S22).

When a value of the sequential touch flag SeqTouch is "0," not "1," the controller 740 determines that two touches have occurred within one frame, not that two touches are sequentially occurring one after the other in two frames. In this case, because an accurate touch position cannot be determined, the controller 740 does not determine a touch position.

Accordingly, the controller 740 sets all values of the touch flags touch1 and touch2 to "0" and stores the values in the register unit 750 (step S23), and outputs the touch generation signal TE of a non-touch state through the touch generation signal generator 760 (step S30). In this case, data of a touch position and the quantity of touches are not output. Thereafter, the controller 740 initializes the values of variables such as a sequential touch flag SeqTouch (step S31).

When the value of the sequential touch flag SeqTouch is "1," as one touch (hereinafter referred to as a "previous touch") that has occurred in a previous frame is sustained and one touch (hereinafter referred to as a "current touch") has occurred in the current frame, the controller 740 determines that two touches have occurred.

Accordingly, the controller 740 determines whether two X-axis position data exist (step S24).

When two X-axis position data do not exist, i.e., when only one X-axis position data exists, the controller 740 determines that two Y-axis position data exist (step S25). That is, the controller 740 determines that values of X-axis position data of two touches are equal, and that values of Y-axis position data of two touches are different because two touches have occurred in the same column.

Accordingly, the controller 740 sets values of two touch flags touch1 and touch2 to "1", sets value of an X-axis position information flag XPosFix to "1", and stores the values in the register unit 750 (step S26). Further, the controller 740 reads position data of the previous touch that is stored in a memory device (not shown) such as a memory, sets X-axis position data of the previous touch as X-axis position data of the current touch, sets a new value different from Y-axis position data of the previous touch as Y-axis position data of the current touch, and stores the values in the memory device (step S26).

Alternatively, the controller 740 may store position data of the previous touch using the buffer unit 710, the register unit 750, or a separate memory device.

Thereafter, the controller 740 goes to step 30 to set a state of the touch generation signal TE to a touch state and output the signal TE through the touch generation signal generator 760. Further, the controller 740 outputs the read X-axis and Y-axis position data of the previous touch and the set X-axis and Y-axis position data of the current touch, and outputs "2" as two touch data and the quantity of touches, respectively through the touch information output unit 770 (step S17). In this case, the value of the X-axis position information flag XPosFix is also output, so that it can be informed that the current touch has occurred in the same column as that of the previous touch. Thereafter, the controller 740 initializes the values of variables Touch1, Touch2, XPosFix, and SeqTouch to "0" at step S31.

When two X-axis position data exist at step S24, the controller 740 determines whether two Y-axis position data exist (step S27).

When two Y-axis position data do not exist, the quantity of the X-axis position data is "2," however the quantity of the Y-axis position data is "1."

Accordingly, the controller 740 determines that two touches have occurred in the same row, i.e. the values of the Y-axis position data are equal and the values of the X-axis position data are different. Accordingly, the controller 740 sets the value of two touch flags touch1 and touch2 to "1", sets the value of the Y-axis position information flag YPosFix to "1", and stores the values in the register unit 750 (step S28). Further, the controller 740 reads position data of the previous touch that is stored in the memory device, sets the Y-axis position data of the previous touch as the Y-axis position data of the current touch, sets a new different value from the X-axis position data of the previous touch as the X-axis position data of the current touch, and stores the values in the memory device (step S28).

Thereafter, the controller 740 sets a state of the touch generation signal TE to a touch state, outputs the signal TE through the touch generation signal generator 760, and outputs the read X-axis and Y-axis position data of the previous touch and the set X-axis and Y-axis position data of the current touch, and outputs "2" as two touch data and the quantity of touches, respectively through the touch information output unit 770 at step S30. In this case, the value of the Y-axis position information flag YPosFix is also output, so that it can be informed that the current touch has occurred in the same row as that of the previous touch, and values of variables Touch1, Touch2, XPosFix, and SeqTouch are initialized to "0" at step S31.

If two Y-axis position data exist at step S27, two different X-axis and Y-axis position data exist. Accordingly, the controller 740 sets values of two touch flags touch1 and touch2 to "1", stores the values in the register unit 750, sets values different from the X-axis and Y-axis position data of the previous touch that are stored in the memory device as the X-axis and Y-axis position data of the current touch, and stores the values (step S29).

Thereafter, the controller 740 sets the state of the touch generation signal TE to a touch state, outputs the signal TE through the touch generation signal generator 760, and outputs the X-axis and Y-axis position data of the previous touch and the X-axis and Y-axis position data of the current touch, and outputs "2" as two touch data and the quantity of touches, respectively through the touch information output unit 770 at step S30, and initializes values of variables Touch1, Touch2, XPosFix, and SeqTouch to "0" at step S31.

In this embodiment, the quantity of touches that are simultaneously detected is set to two at a maximum, however the quantity of touches is not limited thereto, and the quantity of touches that are simultaneously detected may be set to three or more.

In order to determine a touch position by the above manner, only position data of column sense signal lines $SX_1$-$SX_M$ and row sense signal lines $SY_1$-$SY_N$ are required.

However, in a prior art, position data of respective column or row sense signal lines $SX_1$-$SX_M$ or $SY_1$-$SY_N$ and position data of all row or column sense signal lines $SY_1$-$SY_N$ or $SX_1$-$SX_M$ corresponding to the position data are sequentially individually processed, and thus the touch or not and a touch position are determined. Accordingly, in the prior art, in order to determine a touch position, much more data than a case of this embodiment are required, and thus more data processing time is required.

In this embodiment, as the sensing unit, a sensing unit using a variable capacitor and a reference capacitor is exemplified, however the sensing unit is not limited thereto and may use a different type of sensing unit. For example, a pressure sensing unit using the common electrode of the common electrode panel and a sense data line of the thin film transistor array panel as two terminals of which at least one is designed to protrude and outputting the common voltage as an output signal when the two terminals are physically or electrically connected by a user's touch may be employed. In addition, an optical sensor that outputs different signals according to an intensity of light may be employed. Further, the present invention may be applied to a display device including two or more kinds of sensing units.

Further, in this embodiment, as the display device, a liquid crystal display is exemplified, however the display device is not limited thereto, and may be equally employed in a flat panel display such as a plasma display device or an organic light emitting device.

According to the present invention, the touch or not of a sensing unit and a touch position can be accurately determined using only sense signals that are output through a plurality of row sense signal lines and a plurality of column sense signal lines.

Further, instead of using sense signals of all column or row sense signal lines with respect to each row or column sense signal line, the touch or not and a touch position are determined using only sense signals of row and column sense signal lines, so that a data processing amount is reduced and a signal processing time is also reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of driving a display device comprising a plurality of pixels, a plurality of sensing units, and a plurality of sense data lines to which the plurality of sensing units are connected, comprising:
   reading sense signals from the sense data lines;
   determining a touch or not and a quantity of touches, and generating X-axis and Y-axis position data based on the sense signals;
   determining whether the touch is generated;
   determining, once the touch is generated, whether the quantity of touches is plural; and
   determining, when the quantity of touches is plural, whether the plural touches are generated in successive image frames, and touch positions based on the X-axis and Y-axis position data; and
   when the quantity of touches is plural and the plural touches are generated in successive image frames:
     setting the Y-axis position data to the Y-axis position data of a later of the successive image frames when the plural successive touches have occurred in the same column;
     setting the X-axis position data to the X-axis position data of the later of the successive image frames when the plural successive touches have occurred in the same row; and setting the X-axis and Y-axis position data to the respective X-axis and Y-axis position data of the later of the successive image frames when the plural successive touches have occurred in different rows and different columns.

2. The method of claim 1, wherein the determining of a touch position comprises:
determining whether a plurality of touches are generated in successive image frames;
determining, when a plurality of touches are generated in successive image frames, whether a plurality of X-axis position data exist; and
determining, when a plurality of X-axis position data do not exist, that a plurality of Y-axis position data exist, setting X-axis position data of an immediately previous touch as X-axis position data of a current touch, and setting Y-axis position data having a different value from Y-axis position data of the previous touch among first and second Y-axis position data as Y-axis position data of the current touch.

3. The method of claim 2, wherein the determining of a touch position further comprises:
determining, when a plurality of X-axis position data exist, whether a plurality of Y-axis position data exist; and
setting, when a plurality of Y-axis position data do not exist, Y-axis position data of the immediately previous touch as Y-axis position data of the current touch, and setting X-axis position data having a different value from X-axis position data of the previous touch among first and second X-axis position data as X-axis position data of the current touch.

4. The method of claim 3, wherein the determining of a touch position further comprises
setting, when a plurality of Y-axis position data exist, X-axis and Y-axis position data having different values from X-axis and Y-axis position data of the previous touch among the plurality of X-axis and Y-axis position data as X-axis and Y-axis position data of the current touch.

5. The method of claim 4, wherein the determining of a touch position further comprises setting, when the quantity of touches is "1," the X-axis and Y-axis position data as X-axis and Y-axis position data of the current touch.

6. The method of claim 5, wherein the determining of a touch position further comprises changing, when the quantity of touches is "1", a flag value.

7. The method of claim 6, wherein the determining of a touch position further comprises determining whether a plurality of touches are generated in successive image frames based on the flag value.

8. The method of claim 7, further comprising initializing a flag value after X-axis and Y-axis position data of the current touch are set.

9. The method of claim 7, wherein the plurality of touches are generated one in each of immediately successive ones of the image frames.

10. The method of claim 1, wherein the quantity of the plural touches is "2."

11. A display device comprising:
a display panel having a plurality of pixels;
a plurality of first sense signal lines extending in a first direction in the display panel and transferring first sense signals;
a plurality of second sense signal lines extending in a second direction in the display panel and transferring second sense signals;
a plurality of first sensing units that are connected to the first sense signal lines and that generate the first sense signals according to a touch with the display panel;
a plurality of second sensing units that are connected to the second sense signal lines and that generate the second sense signals according to the touch with the display panel; and
a touch determination unit for determining the touch or not and the quantity of touches, and generating X-axis and Y-axis position data of the touch based on the first sense signals and the second sense signals that are transferred through the first sense signal lines and the second sense signal lines, respectively, for determining, when the quantity of touches is plural, whether the plural touches are generated in successive image frames, and touch positions based on the X-axis and Y-axis position data, and for, when the quantity of touches is plural and the plural touches are generated in successive image frames:
setting the Y-axis position data to the Y-axis position data of a later of the successive image frames when the plural successive touches have occurred in the same column;
setting the X-axis position data to the X-axis position data of the later of the successive image frames when the plural successive touches have occurred in the same row; and
setting the X-axis and Y-axis position data to the respective X-axis and Y-axis position data of the later of the successive image frames when the plural successive touches have occurred in different rows and different columns.

12. The display device of claim 11, wherein the touch determination unit determines, when a plurality of touches are generated in successive image frames, whether a plurality of X-axis position data exist, determines, when a plurality of X-axis position data do not exist, that a plurality of Y-axis position data exist, sets X-axis position data of an immediately previous touch as X-axis position data of the current touch, and sets Y-axis position data having a different value from Y-axis position data of the previous touch among first and second Y-axis position data as Y-axis position data of the current touch.

13. The display device of claim 12, wherein the touch determination unit determines, when a plurality of X-axis position data exist, whether a plurality of Y-axis position data exist, sets, when a plurality of Y-axis position data do not exist, Y-axis position data of the immediately previous touch as Y-axis position data of the current touch, and sets X-axis position data having a different value from X-axis position data of the previous touch among first and second X-axis position data as X-axis position data of the current touch.

14. The display device of claim 13, wherein the touch determination unit determines, when a plurality of X-axis position data exist, whether a plurality of Y-axis position data exist, sets, when a plurality of Y-axis position data exist, X-axis and Y-axis position data having a different value from X-axis and Y-axis position data of the previous touch among the plurality of X-axis and Y-axis position data as X-axis and Y-axis position data of the current touch.

15. The display device of claim 14, wherein the touch determination unit sets, when the quantity of touches is "1," the X-axis and Y-axis position data as X-axis and Y-axis position data of the current touch.

16. The display device of claim 11, wherein the touch determination unit comprises a register in which values of a plurality of flags are stored.

17. The display device of claim 16, wherein the flags comprise a sequential touch flag, and the touch determination unit activates, when the quantity of touches is "1," the sequential touch flag.

18. The display device of claim 17, wherein the flags further comprise first and second touch flags, and the touch determination unit sets, when the touch is generated, values of the first touch flag and the second touch flag according to the quantity of touches.

19. The display device of claim 18, wherein the flags further comprise first and second position information flags, and the touch determination unit sets values of the first position information flag and the second position information flag according to whether the plurality of X-axis position data or the plurality of Y-axis position data exist.

20. The display device of claim 16, wherein the touch determination unit further comprises a touch state determination unit for determining the touch or not and the quantity of touches, and generating the X-axis position data and Y-axis position data, and a controller for determining the touch position.

21. The display device of claim 20, wherein the touch determination unit further comprises a touch generation signal generator and a touch information output unit, and the touch generation signal generator generates and outputs a touch generation signal of the corresponding state according to the touch or not, and the touch information output unit outputs X-axis and Y-axis position data of the current touch.

22. The display device of claim 11, wherein the sensing unit comprises:
 a variable capacitor that has liquid crystal as a dielectric and that has capacitance that changes according to a pressure; and
 a reference capacitor that is connected in series to the variable capacitor.

* * * * *